(12) United States Patent
Takeda et al.

(10) Patent No.: US 9,224,379 B2
(45) Date of Patent: Dec. 29, 2015

(54) ACOUSTIC DECORATIVE MATERIAL

(75) Inventors: Yoshihiko Takeda, Miyagi (JP); Jiro Hattori, Atsugi (JP); Toshifumi Sakai, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/237,585

(22) PCT Filed: Aug. 23, 2012

(86) PCT No.: PCT/US2012/052044
§ 371 (c)(1),
(2), (4) Date: Feb. 7, 2014

(87) PCT Pub. No.: WO2013/028850
PCT Pub. Date: Feb. 28, 2013

(65) Prior Publication Data
US 2014/0182967 A1 Jul. 3, 2014

(30) Foreign Application Priority Data
Aug. 25, 2011 (JP) ................. 2011-183356

(51) Int. Cl.
*G10K 11/16* (2006.01)
*G10K 11/00* (2006.01)
(Continued)

(52) U.S. Cl.
CPC ............ *G10K 11/002* (2013.01); *B32B 3/266* (2013.01); *B32B 7/12* (2013.01); *B32B 17/06* (2013.01); *B32B 27/12* (2013.01); *E04B 1/8409* (2013.01); *G10K 11/16* (2013.01); *B32B 2262/101* (2013.01); *B32B 2307/10* (2013.01); *B32B 2307/102* (2013.01); *B32B 2419/00* (2013.01); *B32B 2451/00* (2013.01);
(Continued)

(58) Field of Classification Search
CPC ............. B32B 17/06; B32B 2262/101; B32B 2307/10; B32B 2307/102; G10K 11/002; E04B 2001/8461; E04B 2001/848
USPC ......................... 181/290, 291, 293
See application file for complete search history.

(56) References Cited

U.S. PATENT DOCUMENTS 3,621,934 A * 11/1971 Thrasher et al. ............ 181/290
3,628,626 A * 12/1971 Merrill ....................... 181/290
(Continued)

FOREIGN PATENT DOCUMENTS

EP         1840287       10/2007
JP        61-150123 U    9/1986
(Continued)

OTHER PUBLICATIONS

International search report for PCT international application No. PCT/US2012/052044, mailed on Jan. 31, 2013, 3pgs.

*Primary Examiner* — Jeremy Luks

(57) ABSTRACT

An acoustic decorative sheet includes a film layer, a glass cloth layer, and an adhesive layer separating the film layer from the glass cloth layer. The adhesive layer is adhered to the film layer and the glass cloth layer. The film layer and the adhesive layer have a plurality of micro bores disposed there through. The micro bores have a diameter in a range from 20 to 500 micrometers and number from 2 to 700 microbores per $cm^2$. An acoustic assembly includes the acoustic decorative sheet, a substrate; and an air gap at least partially separating the acoustic decorative sheet from the substrate.

16 Claims, 2 Drawing Sheets

(51) Int. Cl.
*B32B 7/12* (2006.01)
*B32B 27/12* (2006.01)
*B32B 3/26* (2006.01)
*E04B 1/84* (2006.01)
*B32B 17/06* (2006.01)
*E04B 1/82* (2006.01)

(52) U.S. Cl.
CPC .. *E04B 2001/8281* (2013.01); *E04B 2001/848* (2013.01); *E04B 2001/8461* (2013.01)

(56) References Cited

U.S. PATENT DOCUMENTS

| | | | |
|---|---|---|---|
| 5,622,662 A | 4/1997 | Veiga | |
| 7,654,364 B2 * | 2/2010 | Yamaguchi et al. | 181/293 |
| 2002/0053484 A1 * | 5/2002 | Murakami et al. | 181/293 |
| 2004/0020712 A1 * | 2/2004 | Bargo, II | 181/290 |
| 2004/0069564 A1 * | 4/2004 | Wang et al. | 181/293 |
| 2007/0137926 A1 * | 6/2007 | Albin et al. | 181/290 |
| 2008/0057283 A1 | 3/2008 | Blinkhorn | |
| 2009/0250293 A1 * | 10/2009 | Gleine et al. | 181/292 |

FOREIGN PATENT DOCUMENTS

| | | | |
|---|---|---|---|
| JP | 62-87349 | 4/1987 | |
| JP | 1-138010 U | 9/1989 | |
| JP | 2005-264673 | 9/2005 | |
| JP | H04-144740 | 6/2008 | |
| JP | 2010-196421 | 9/2010 | |
| WO | WO 00-05707 | 2/2000 | |
| WO | WO 2009129139 A2 * | 10/2009 | G10K 11/172 |

\* cited by examiner

ACOUSTIC DECORATIVE MATERIAL

CROSS REFERENCE TO RELATED APPLICATIONS

This application is a national stage filing under 35 U.S.C. 371 of PCT/US2012/052044, filed Aug. 23, 2012, which claims priority to Japan Application No. JP 2011-183356, filed Aug. 25, 2011, the disclosure of which is incorporated by reference in its/their entirety herein.

BACKGROUND

The present disclosure relates to an acoustic decorative sheet and an acoustic assembly.

A decorative sheet is used as a skin material such as for the surface of a wall inside a building or vehicles, ceiling, or floor. For example, JP-T 2002-521722 relates to an acoustic material using a micro bored film. JP-A No. 2010-196421 describes a sound absorbing decorative sheet using a micro bored decorative sheet. This sound absorbing decorative sheet absorbs sound and includes a decorative film layer, a continuous foam body layer, and an adhesive layer having micro bores.

The surface strength of the above acoustic decorative sheets may not be strong enough. Therefore, when used as a skin material such as the surface of a wall inside the building or vehicles, ceiling, or floor, there is a possibility of cracking or denting on the surface and the surface film also may break. Acoustic decorative sheets having improved strength is desired.

SUMMARY

The present disclosure provides an acoustic decorative sheet for mounting on an article or substrate. The substrate can have a sound reflective surface.

In many embodiments, an acoustic decorative sheet includes a film layer, a glass cloth layer, and an adhesive layer separating the film layer from the glass cloth layer. The adhesive layer is adhered to the film layer and the glass cloth layer. The film layer and the adhesive layer have a plurality of micro bores disposed there through. The micro bores have a diameter in a range from 20 to 500 micrometers and number from 2 to 700 micro bores per cm$^2$.

In many embodiments, an acoustic assembly includes the acoustic decorative sheet, a substrate, and an air gap at least partially separating the acoustic decorative sheet from the substrate.

The present disclosure provides an acoustic decorative sheet that can be used as an acoustic dampening material that is decorative and has sufficient surface strength to be utilized as a building material. The acoustic decorative sheet has a glass cloth layer that assists in preventing breakage or cracking of the acoustic decorative sheet.

DETAILED DESCRIPTION

Figure 1:
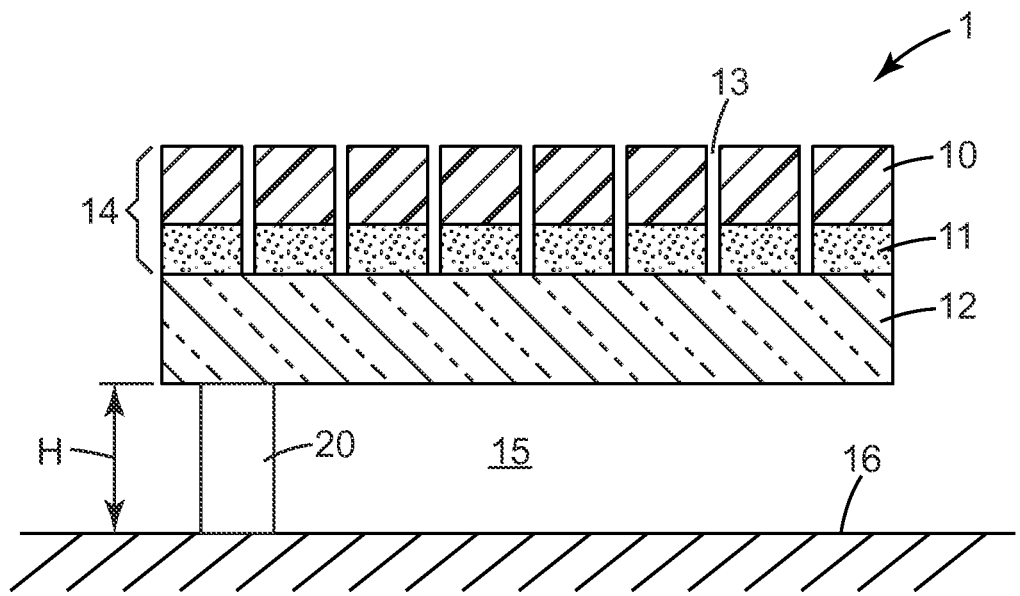
FIG. 1 is a cross-sectional view of an illustrative acoustic assembly of the present disclosure.
Figure 2:
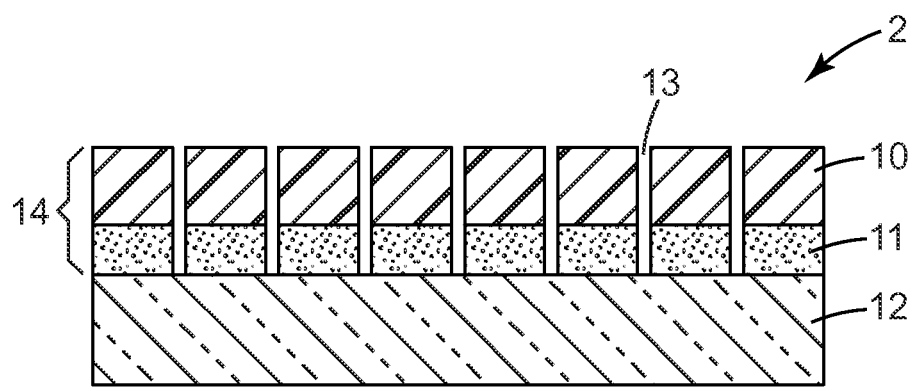
FIG. 2 is a cross-sectional view of an illustrative acoustic decorative sheet of the present disclosure.

An acoustic decorative sheet of the present disclosure is mounted on a substrate or article having a sound reflective surface. The acoustic decorative sheet is placed near or adjacent to the substrate or article surface so as to define an air space layer or air gap between the acoustic decorative sheet and the article or substrate. A spacer element at least partially separating the substrate from the acoustic decorative sheet having a height (H) can define the air gap or air space layer. The acoustic decorative sheet includes a decorative film layer and a glass cloth layer. The substrate or reflective surface of an article has a surface opposing the glass cloth layer.

The acoustic decorative film layer is formed by laminating an adhesive layer on the film layer. A design can be made by any know method such as gravure printing or offset printing using ink or, by utilizing a color film. Moreover, the film layer can be made up of a single layer or two or more layers. In case of two or more layers, the adhesive and a primer layer, or a layer having other functions can also be included between each layer of the film layer.

The film layer can be formed of a polymer or resin material. The polymer or resin can include for example, various synthetic resins such as vinyl chloride resin, vinyl chloride, vinyl acetate resin, acrylic resin, polyester resin, cellulose resin, or polyolefin resin, or combinations thereof. Among these, when using a single layer as a film layer, the film includes polyvinyl chloride resin, for example.

Furthermore, when the film has two or more layers, for example, a transparent surface protective layer includes fluorine resin or acrylic resin laminated on the film layer including vinyl chloride resin. A decorative design can be made on the surface of the film layer or the surface protective layer by known printing methods.

The thickness of the film layer is not limited in particular; however, for example, it can be in a range from about 0.01 mm to 0.5 mm.

The adhesive layer separates the film layer from the glass cloth layer and adheres to the film layer and the glass cloth layer forming a tri-layer laminate. In many embodiments, the film layer is adhered directly on the adhesive layer and the glass cloth layer is adhered directly on the adhesive layer. The adhesive layer can include known pressure-sensitive adhesives and/or heat-sensitive adhesives to adhere the film layer and the glass cloth layer. For example, the adhesive layer can include a pressure-sensitive contact film being a single-layer film containing adhesive polymer or a double-sided adhesion sheet having two pressure-sensitive adhesion layers.

The adhesive layer, for example, can be manufactured by preparing a separate adhesive layer with a release paper having a coated adhesive layer on a stripped surface of the release paper and carrying out the dry lamination of this adhesive layer and the film layer. Or, adhesives such as adhesive polymer, can be applied and dried on the film layer and can be considered as an adhesive layer.

The thickness of the adhesive layer is not limited in particular; however, for example, it can be in a range from about 0.01 mm to 0.2 mm.

The decorative film layer has a plurality of micro bores that extend from the film layer through the adhesive layer to the glass cloth layer. Micro bores can have any useful size and can be in a range from 20 to 500 micrometers in diameter and number in a range from 2 to 700 per cm$^2$ (i.e., number density). In these ranges, a desired sound absorption can be obtained while maintaining its decorative appearance.

The diameter of the micro bores extend through the surface of the film layer and adhesive layer. In some embodiments the diameter of the micro bores are in a range from 40 to 350 micrometers or from 50 to 250 micrometers. The number density indicates the number of micro bores per unit area. In some embodiments the number density ranges from 4 to 625 per cm² or from 10 to 200 per cm². The above-mentioned suitable range of diameter and number density can be appropriately combined in any useful combination.

The decorative film layer is formed by making a micro bores with any useful method such as needle or drill or by using a laser, for example after laminating the film layer and the adhesive layer as mentioned above. A commercial interior decorative sheet or graphic film with an adhesive layer provided with micro bores as mentioned above can also be used.

Laser irradiation to form the micro bores can be carried out using known equipment; such as, for example, a carbon dioxide laser irradiation machine made by Horiuchi Electronics Co. Ltd. (LSS-S050VAH-W) or the carbon dioxide laser irradiation machine (LUMONICS IMPACT2500 "LAVIA1000TW") made by Sumitomo Heavy Industries Mechatronics, Ltd. (Shinagawa-ku, Tokyo Japan). In one embodiment, micro bores are formed by utilizing the laser equipment described above with the following operating parameters: wavelength: 9.3 micrometers, average maximum output of laser irradiation machine: 65 W; and Galvano system: x2 head, and the processing conditions can be set, output: 1 to 1.6 W.

A glass cloth layer improves the surface strength of the acoustic decorative sheet and at the same time provides a low flammability characteristic to the acoustic assembly. Therefore, breakage or cracking on the surface of the acoustic assembly or the acoustic decorative sheet can be prevented or minimized. Furthermore, the glass cloth layer also contributes in improving the rigidity of the acoustic decorative sheet, thereby improving the operability of the acoustic assembly and the acoustic decorative sheet.

The glass cloth layer can include a known glass cloth. The thickness and weight of the glass cloth layer are not limited and can be suitably chosen in the range that can provide permeability and sufficient surface strength to the acoustic decorative sheet. For example, the thickness of the glass cloth layer can be from about 10 micrometers or more, 30 micrometers or more, or 50 micrometers or more, and about 300 micrometers or less, 200 micrometers or less, or 100 micrometers or less or in a range from 10 to 300 micrometers, or from 30 to 200 micrometers, or from 50 to 100 micrometers. The weight can be set to about 10 g/cm² or more or 30 g/cm² or more and about 350 g/cm² or less or 200 g/cm² or less, or in a range from 10 to 350 g/cm² or in a range from 30 to 350 g/cm². Exemplary glass cloth includes H105 made by Unitika Co. Ltd. (Chuo-ku, Osaka, Japan).

The acoustic decorative sheet may have a further adhesive layer on the surface (surface of the article side) of the side opposite to the film layer, in order to adhere the corresponding sheet to the spacer. This further adhesive layer can be a continuous or discontinuous layer. For this adhesive layer, a comparable thickness can be obtained by the same method using the adhesives the same as used for adhesive layer of the glass cloth and film layer. This adhesive layer can further have a liner (release paper). Such a liner may be generally used in fields, such as adhesive tape, and is not limited to a specific component. For example the liner can be made of paper or plastic materials such as polyethylene, polypropylene, polyester, or cellulose acetate, or covered by such plastic material or a paper laminating it, or other materials. Although these liners may be used as they are, it is preferred to use it after processing by the method of siliconizing or other methods to improve the release properties of the liner. Furthermore, the thickness of the liner is not particularly limited; however, usually, it can be set to a range of about 0.025 to 0.5 mm or about 0.05 to 0.2 mm.

The decorative sheet can be made by adhering the glass cloth layer of a desired thickness to the adhesive layer of the micro bored decorative film layer. Or, it can be obtained by adhering together the adhesive layer and a glass cloth layer which are obtained by applying and drying the adhesive polymer solution on a liner.

The overall thickness (e.g., "total thickness") of the acoustic decorative sheet is not limited in particular and can be suitably chosen in the aspect of the sheet to be used. The 'total thickness' indicates the sum total of thickness of the film layer, adhesive layer, and a glass cloth layer. The total thickness is not limited in particular if it is in the range that obtains the effect of the present disclosure; however, for example, it can be set to about 0.1 mm or more, 0.2 mm or more, 1 mm or less, and 0.5 mm or less or in a range from 0.1 to 1 mm or from 0.1 to 0.5 mm. The decorative sheet further may also contain additional functional layers such as a primer layer.

The acoustic assembly is used for mounting the acoustic decorative sheet on the article or substrate that may have a sound reflective surface. The sound reflective surface or substrate surface of the article and a glass cloth layer of the acoustic decorative sheet face opposite to each other and the acoustic decorative sheet is placed or positioned so as to determine the air space layer or air gap between them or separating them.

The article or substrate can be a part of the adhered for attaching the acoustic decorative sheet. For example, it can be a wall surface, ceiling surface, or floor surface of structure, such as a housing complex, building, and other buildings; or partition. The article or substrate may have a base material such as metal or gypsum, for example. In some embodiments, the acoustic assembly is attached to a base material and then attached to a wall surface, ceiling surface, floor surface, or partition, or wall, ceiling, floor, or partition might be formed of such acoustic assembly.

The air space layer or air gap can be determined by fixing the acoustic decorative sheet such that a desired distance is maintained by providing a spacer between the substrate or article and the acoustic decorative sheet. The article and a decorative sheet do not always need to maintain the same fixed distance in all areas of the acoustic assembly. For example, if the substrate or article has an unevenness or three-dimensional shape, the external or outer surface of the acoustic decorative sheet (i.e., film layer) can be made flat or planar by fixing the article and acoustic decorative sheet with a spacer such that the distance between the surface of the article or substrate and the acoustic decorative sheet may change depending on the location along the acoustic assembly. For the spacer, articles such as grid, mesh, lattice, or framework can be used. For example, the acoustic decorative sheet can be wrapped around a frame and mechanically fixed in place without using an adhesive.

The acoustic assembly is formed by known methods. For example, in the case of an acoustic assembly attached to an article such as a wall surface, it is formed by fixing the acoustic decorative sheet and spacer with adhesives and by fixing the spacer to the substrate surface, such as the wall surface by adhesives. Or, in the case of an acoustic material with an acoustic decorative sheet attached to a base material, the acoustic decorative sheet and spacer are fixed by adhesives and the acoustic assembly is formed by attaching these to the base material such as a metal or gypsum board for example, by means of bonding or adhering with adhesive. In this case, this acoustic assembly can be connected to construct the wall surface.

Having an air space layer or air gap between the acoustic decorative sheet and the substrate improves the sound absorption of the acoustic assembly, and changing the thickness of the air space layer or air gap allows for adjustments to the sound absorption characteristic of the acoustic assembly. The thickness of the air space layer or air gap is known as the distance between the surface of the article and the inner surface (surface of article side) of the acoustic decorative sheet, and can be suitably adjusted according to the desired sound absorption characteristic. Specifically, the air gap can be set to, for example, about 2 mm or more, 5 mm or more, 8 min or more, 10 mm or more, 50 mm or less, 30 mm or less, and 20 mm or less. In many embodiments, the air gap can be set to a range from 2 to 50 mm or from 2 to 20 mm.

Since the acoustic decorative sheet includes a glass cloth layer, it has superior strength on its outer surface. Therefore, even if the acoustic assembly has an air space layer or air gap between the decorative sheet and the article, the rigidity on the surface of the acoustic assembly is not lost and also, and breakage or cracking on the surface can be prevented or mitigated.

EXAMPLES

Preparation of Acoustic Decorative Sheet Samples

Sample 1

With the carbon dioxide laser machine made by Horiuchi Electronics Co. Ltd. (LSS-S050VAH-W), a laser of output 6 W was carried out on the decorative film (DI-NOC™ film FW-888 made by Sumitomo 3M Limited, thickness of about 200 micrometer) having a laminated acrylic pressure sensitive adhesive and polyvinyl chloride film, in order to provide micro bores having a diameter of about 350 micrometers and a pitch of 2 mm (number density 25 per $cm^2$). The liner was removed from the obtained micro bored DI-NOC™ film and was adhered on the 100 micrometer thick glass cloth sheet (brand name H105, made by Unitika Co. Ltd. (Chuo-ku, Osaka, Japan)) in order to create sample 1.

Sample 2

With the carbon dioxide laser machine made by Horiuchi Electronics Co. Ltd. (LSS-S050VAH-W), a laser of output 6 W was carried out on the decorative film (DI-NOC™ film FW-888 made by Sumitomo 3M Limited, thickness approx 200 micrometer) having a laminated acrylic pressure sensitive adhesive and polyvinyl chloride film, in order to provide micro bores same as sample 1. The liner was removed from the obtained micro bored DI-NOC™ film and was adhered on the 3 mm thick flexible urethane resin layer (VHZ, made by Bridgestone Chemical Ltd). The acrylic pressure sensitive adhesive (mass ratio, butylacrylate: acrylic acid=90:10 and solid content: 32%) was applied to a liner by a knife coat having a thickness after drying of 40 micrometer to make an adhesive layer which was laminated on the flexible urethane resin layer in order to create sample 2.

Heat Release Test

Heat release test was carried out based on the fire protection and fireproof performance test evaluation service document (Jun. 1, 2010, modified version) 4.10.2 of General Building Research Corporation of Japan, in order to measure a calorific value and heat generation rate (200 $kW/m^2$ excess time). Results are shown in Table 1.

Measurement of Acoustic Absorption Coefficient

Figure 3:
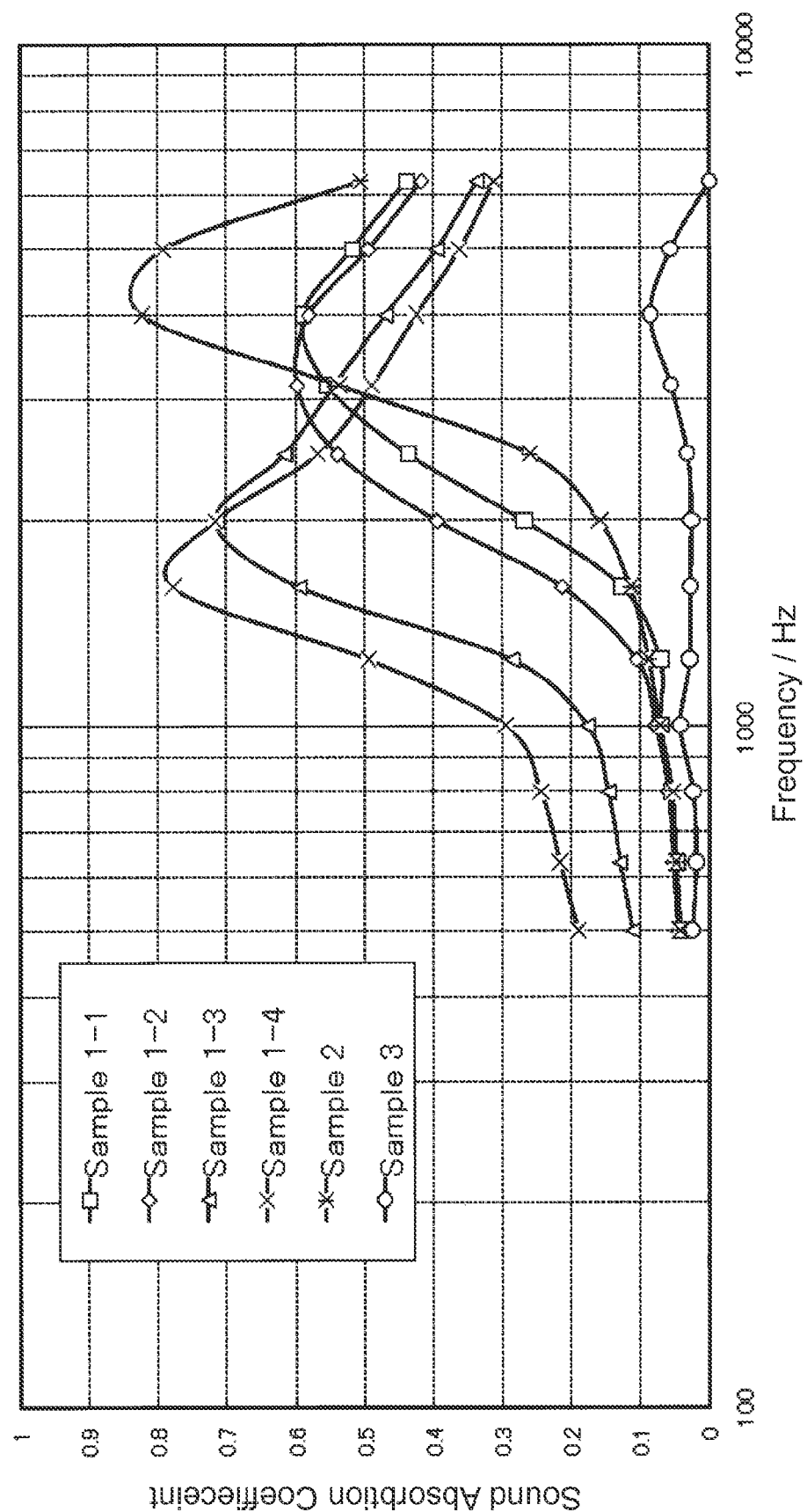
FIG. 3 is a graph showing the acoustic absorption characteristics of four acoustic assemblies of the present disclosure and two comparative examples.

Acoustic absorption coefficient was measured using a vertical incidence sound absorption measurement machine in accordance with ASTM E1050. The sample diameter was 29 mm. Results are shown in FIG. 3. The air space layer or air gap and the sample (the aforementioned sample 1 or 2) used in each Sample.

Sample 1-1: Sample 1, thickness of air space layer or air gap 3 mm
Sample 1-2: Sample 1, thickness of air space layer or air gap 4 mm
Sample 1-3: Sample 1, thickness of air space layer or air gap 8 mm
Sample 1-4: Sample 1, thickness of air space layer or air gap 13 mm
Sample 2: Sample 2, without air space layer
Sample 3: Sample 1, without air space layer Measurement of Tear Strength Tear strength was measured for sample 1 and 2 based on JISL1096C. The tension speed was 15 cm/min and the grip interval (length of specimen between grips) was 2.5 cm, and measured in the direction perpendicular (CD: Cross machine Direction) to the flow direction of web and flow direction (MD: Machine Direction) of the film web. The result is shown in Table 2.

TABLE 1

|  | Caloric Value ($MJ/m^2$) | Period beyond 200 $kw/m^2$ (second) |
|---|---|---|
| Sample 1 | 5.2 | 6 |
| Sample 2 | 8.4 | 4 |
| Criteria | 8 $MJ/m^2$ or less | Less than 10 seconds |

TABLE 2

| Sample 1 (/N) | | Sample 2 (/N) | |
|---|---|---|---|
| MD | CD | MD | CD |
| 258.5 | 181.1 | 14.2 | 13.6 |

FIGURE REFERENCE NUMERALS

1 Acoustic assembly
2 Acoustic decorative sheet
10 Film layer
11 Adhesive layer
12 Glass cloth layer
13 Micro bores
14 Decorative film layer
15 Air space layer or air gap
16 Substrate or surface
20 Spacer element
H Spacer height

What is claimed is:
1. An acoustic decorative sheet comprising:
a film layer;
a glass cloth layer; and
an adhesive layer separating the film layer from the glass cloth layer, the adhesive layer adhered to the film layer and the glass cloth layer;
wherein the film layer and the adhesive layer have a plurality of micro bores disposed there through, the micro bores having a diameter in a range from 20 to 500 micrometers and number from 2 to 700 microbores per $cm^2$; and wherein the glass cloth layer has a thickness in a range from 10 to 300 micrometers wherein the micro bores do not extend into the glass cloth layer.

2. The acoustic decorative sheet according to claim 1 wherein the glass cloth has a weight in a range from 30 g/cm$^3$ to 350 g/cm$^3$.

3. The acoustic decorative sheet according to claim 1 wherein the micro bores have a diameter in a range from 50 to 250 micrometers.

4. The acoustic decorative sheet according to claim 1 wherein the micro bores number from 10 to 200 micro bores per cm$^2$.

5. The acoustic decorative sheet according to claim 1 wherein the film layer is a polymer film layer.

6. The acoustic decorative sheet according to claim 1 wherein the film layer is adhered directly on the adhesive layer and the glass cloth layer is adhered directly on the adhesive layer.

7. An acoustic assembly comprising:
the acoustic decorative sheet of claim 1;
a substrate; and
an air gap at least partially separating the acoustic decorative sheet from the substrate.

8. An acoustic assembly according to claim 7 further comprising a spacer element having a height and defining the air gap, the spacer element separating the substrate from the glass cloth layer.

9. The acoustic material according to claim 8, wherein a thickness of the air gap or height of the spacer element is in a range from 2 mm to 50 mm.

10. The acoustic material according to claim 8, wherein a thickness of the air gap or height of the spacer element is in a range from 2 mm to 20 mm.

11. The acoustic assembly according to claim 7 wherein the glass cloth has a weight in a range from 30 g/cm$^3$ to 350 g/cm$^3$.

12. The acoustic assembly according to claim 7 wherein the micro bores have a diameter in a range from 50 to 250 micrometers.

13. The acoustic assembly according to claim 7 wherein the micro bores number from 10 to 200 micro bores per cm$^2$.

14. The acoustic assembly according to claim 9 wherein the glass cloth has a weight in a range from 30 g/cm$^3$ to 350 g/cm$^3$.

15. The acoustic assembly according to claim 9 wherein the micro bores have a diameter in a range from 50 to 250 micrometers.

16. The acoustic assembly according to claim 9 wherein the micro bores number from 10 to 200 micro bores per cm$^2$.

* * * * *

UNITED STATES PATENT AND TRADEMARK OFFICE
CERTIFICATE OF CORRECTION

| | |
|---|---|
| PATENT NO. | : 9,224,379 B2 |
| APPLICATION NO. | : 14/237585 |
| DATED | : December 29, 2015 |
| INVENTOR(S) | : Yoshihiko Takeda |

Page 1 of 1

It is certified that error appears in the above-identified patent and that said Letters Patent is hereby corrected as shown below:

Specification

Column 5
Line 10, delete "min" and insert -- mm --

Signed and Sealed this
Nineteenth Day of July, 2016

Michelle K. Lee
*Director of the United States Patent and Trademark Office*